United States Patent Office 3,234,249
Patented Feb. 8, 1966

3,234,249
POLYHYDROXY ESTERS
Karl Brack, Wilmington, Del., assignor to Hercules Powder Company, Wilmington, Del., a corporation of Delaware
No Drawing. Filed June 25, 1962, Ser. No. 205,113
12 Claims. (Cl. 260—407)

This invention relates to new polyols and, more particularly, to polyhydroxyesters which contain four or more hydroxyl groups and are prepared by reacting polycarboxylic acids with epoxy alcohols.

In accordance with this invention it has been found that a valuable new class of polyhydroxyesters may be prepared by reacting a polycarboxylic acid with an epoxy alcohol, the reaction taking place between the acid groups and the epoxy groups to form $\beta,\omega$-dihydroxyalkylesters of said polycarboxylic acids. Thus, from a dicarboxylic acid a tetrol is obtained, and from a tricarboxylic acid a hexol is obtained. In addition, some esterification may take place wherein the primary (or secondary) alcohol group of the epoxy alcohol reacts with the carboxylic acid group whereby there are formed correspondingly higher polyols. Using the reaction of a dicarboxylic acid with an epoxy alcohol to illustrate the invention, the reaction which takes place may be set forth as follows:

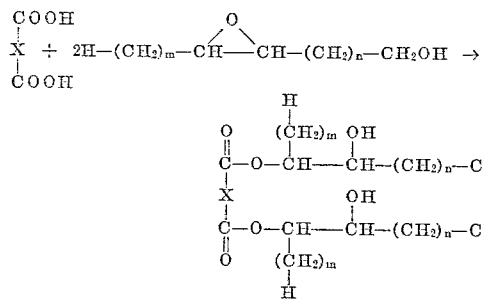
(1)

where X represents an alkylene or phenylene radical, and $m$ and $n$ are each any whole number from 0 to 10, and may be alike or different, and the sum of $m+n$ is from 7 to 15. Since either epoxy oxygen to carbon bond can open, either one or both of the following isomeric tetrahydroxyesters may be formed along with that illustrated in (1):

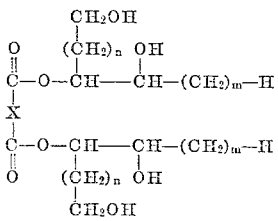
(2)

or

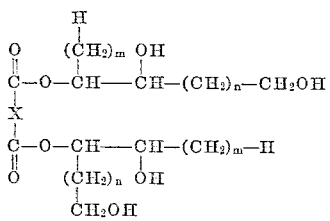
(3)

Thus, the new tetrahydroxyesters of this invention may be defined as having the structure

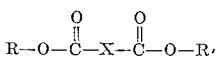
(4)

where R and R' are each

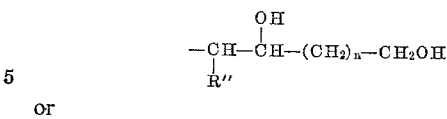

or

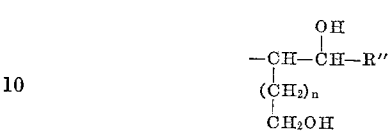

and may be alike or different and where R" is hydrogen or alkyl, $n$ is from 0 to 10, the sum of $n$ and the carbons in R" being from 7 to 15, and X is alkylene or phenylene.

As pointed out above, some esterification can take place between the primary (or secondary) alcohol group and the carboxylic acid which may be represented by the following equation:

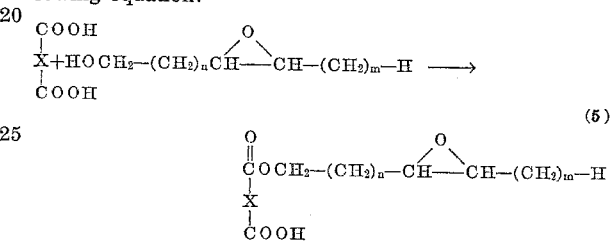
(5)

The product from the latter reaction may then undergo further esterification whereby the carboxyl group remaining in the product will undergo the type of esterification reaction set forth in (1), and the epoxy group will also undergo esterification according to the reaction set forth in (1), whereby there is produced a pentol having a formula of the following type:

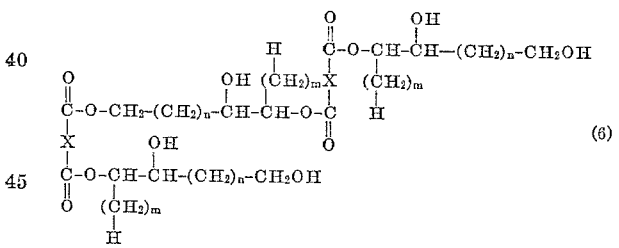
(6)

or one of the several isomers thereof such as

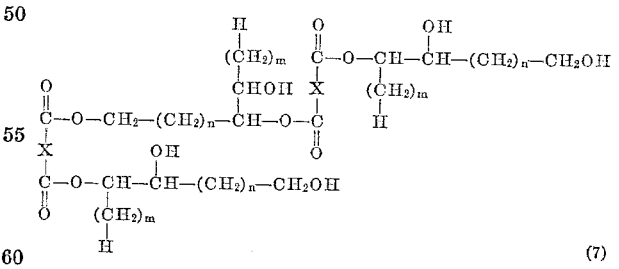
(7)

or

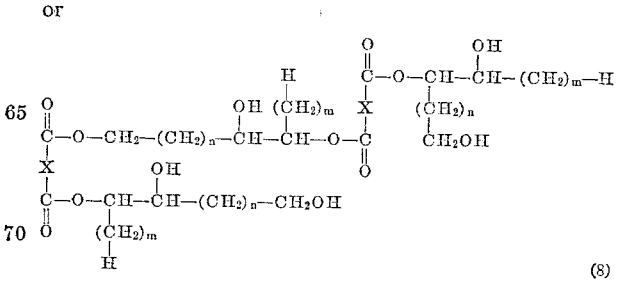
(8)

etc. Thus, the pentahydroxyesters of this invention may be defined as

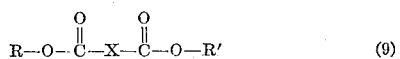

where R has the definition set forth above and R' is

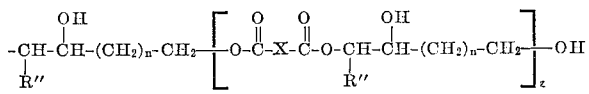

or

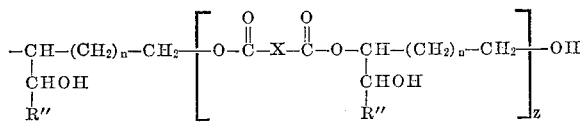

where R" and n have the same definitions as above and z is 1. Thus, the polyhydroxy esters of this invention have the general formula shown in (9), where z will be 0 or 1. The esterification rate of the primary alcohol is much smaller than the rate of the carboxylic acid-epoxide reaction; and, accordingly, the more complex type of alcohols represented above, the pentols, is formed in much smaller amounts. The amount of this side reaction can be considerably reduced also by using a large excess of the epoxy alcohol.

The esterification of the polycarboxylic acids and the epoxy alcohols is readily carried out by mixing the two reagents and heating the mixture to a temperature of from about 80° C. to about 200° C. until the esterification reaction is completed. An inert diluent may be used in carrying out this esterification reaction if desired, but it is generally not necessary. Among the inert diluents that may be used are benzene, toluene, cyclohexanone, methyl isobutyl ketone, dimethyl sulfoxide, etc. While catalysts are not necessary to bring about this reaction, it is frequently desirable to add a catalyst in order to speed up the reaction. Exemplary of the catalysts that may be used are alkali metal alkoxides such as sodium methoxide, alkali metal salts of the polybasic acid that is being reacted, amines such as triethylene-diamine, trimethylbenzylammonium hydroxide, and salts of heavy metals such as cobalt acetate and mercuric acetate, etc.

Any polycarboxylic acid may be esterified with an epoxy alcohol to produce the new polyhydroxy esters of this invention. Exemplary of the polycarboxylic acids that may be used are dicarboxylic acids such as succinic acid, adipic acid, pimelic acid, azelaic acid, sebacic acid, 1,12-dodecanedioic acid, and the long chain polymerized unsaturated fatty acids as, for example, dimerized higher fatty acids such as dimerized oleic acid, dimerized undecylenic acid, dimerized tall oil fatty acids, etc., phthalic acid, isophthalic acid, terephthalic acid, etc., and tricarboxylic acids such as 1,2,3-propane tricarboxylic acid, citric acid, trimellitic acid, trimesic acid, etc. Epoxy alcohols that may be used for this esterification reaction are aliphatic epoxy alcohols containing at least ten carbon atoms as, for example, 9,10-epoxydecanol, 10,11-epoxyundecanol, 9,10-epoxyoctadecanol, etc. Thus, the epoxy alcohols have the general formula

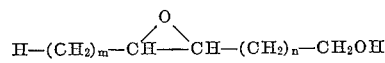

where m and n are whole numbers from 0 to 10 and the sum of m+n is from 7 to 15.

As set forth above, in addition to the esterification reaction between the carboxylic acid group and the epoxide group, some reaction may occur between the primary (or secondary) alcohol group of the epoxy alcohol and the carboxylic acid group. While this secondary reaction is a minor reaction, and not the major reaction, it may be considerably reduced by using a large excess of the epoxy alcohol so that the concentration of the epoxide group remains at a high level throughout the reaction. Unless such a large excess is used, obviously the concentration of the primary alcohol groups is increased throughout the reaction since the epoxide group is being used up in the reaction. Obviously, to produce the hydroxyesters of this invention it is necessary to use at least an amount of the epoxy alcohol equal to one mole thereof for every carboxylic acid group in the carboxylic acid. Thus, for dicarboxylic acids there will be used at least 2 moles of the epoxy alcohol, and for tricarboxylic acids, 3 moles, etc.

For most uses the reaction product may be a mixture of the tetrol or hexol with the ester produced by the above-mentioned secondary reaction; that is, the pentol or heptol, etc. However, if it is desired to obtain the pure esters as, for example, either the pentols or tetrols, which would be obtained from the dicarboxylic acid, or the hexols or heptols from tricarboxylic acids, they may be separated readily by countercurrent extraction.

The new polyols of this invention are useful for the preparation of foams, films, elastomers, and plastics of various degrees of hardness, flexibility, etc., by reacting them with di- or polyisocyanates, anyhdrides, dicarboxylic acids, bis-epoxides, melamine-formaldehyde resins, urea-formaldehyde resins.

The following examples will illustrate the preparation of the new polyhydroxyesters of this invention. All parts and percentages are by weight unless otherwise stipulated.

*Example 1*

The dicarboxylic acid used in this example was the commercial mixture of acids known as dimer acid, containing about 95% dimerized tall oil fatty acids and 4% of the trimerized tall oil fatty acids. A mixture of 140.0 parts of the above dimer acid, 200.0 parts of 9,10-epoxyoctadecanol (containing 4.17% oxirane and 74% pure), and 1.0 part of trimethylenediamine was heated to 200° C. for 4 hours. During this time the acid number of the reaction mixture dropped from 85 to 2.7. The ester number rose to 84.5 during the same period, and the hydroxyl number of the final reaction mixture was 177.1. A portion of this crude reaction mixture (296.0 parts) was topped (to remove light ends) in a spinning disk molecular still at 28–30 microns pressure up to 250° C. There was obtained 225.7 parts of product. The bis(dihydroxyoctadecyl)ester of the dimer acid so obtained on analysis was found to have an acid number of 1.6, an ester number of 95.1 and active hydrogen (as hydroxyl) of 5.45. It has a molecular weight of 1210.

*Example 2*

A mixture of 560 parts of the above dimer acid, 1000 parts of 9,10-epoxyoctadecanol (75% pure based on its oxirane oxygen content) and 1 part of trimethylbenzylammonium hydroxide was heated at 130° C. for 66 hours. During this time the acid number of the reaction mixture dropped to 1.9. From 603 parts of the above reaction mixture there was obtained by topping on a spinning disk still 435 parts of a product having an acid number of 2.3, ester number of 99.8, and containing 4.44% of active hydrogen (measured as hydroxyl and corrected for water and carboxylic acid).

*Example 3*

A mixture of 11.5 parts of 1,12-dodecanedioic acid, 28.4 parts of 9,10-epoxyoctadecanol (5.6% oxirane) and 0.5 part of sodium methoxide was heated at 200° C. for 3 hours. The unreacted epoxyoctadecanol was then removed under reduced pressure at 200° C. The crude residue so remaining was dissolved in 140 parts of diethyl ether and was washed first with 50 parts of an aqueous 10% sodium hydroxide solution and twice with 50 parts of water. After drying over sodium sulfate, the ether was removed and there remained 27.8 parts of a clear, off-white resin which had an acid number of 2.1, an ester number of 132.7 and a hydroxyl number of 231.1.

Example 4

A mixture of 146 parts of adipic acid, 1000 parts of 9,10-epoxyoctadecanol (4.2% oxirane oxygen) and 2 parts of triethylenediamine was heated to 130° C. for 28 hours. During this time the acid number of the reaction mixture dropped from 97.0 to 5.2. On topping on a spinning disk still up to 300° C. there was obtained 338 parts of the product which had an acid number of 1.6, an ester number of 151.8, and contained 6.93% active hydrogen (as hydroxyl).

Example 5

A mixture of 166 parts of isophthalic acid, 100 parts of 9,10-epoxyoctadecanol (75% pure and containing 4.2% oxirane oxygen) and 3 parts of triethylenediamine was heated at 150° C. for 12 hours. The reaction mixture was then topped in a spinning disk still, whereby there was obtained 762 parts of topped product, which had an acid number of 6.0, an ester number of 126.0, and a hydroxyl number of 255.0.

Example 6

The mixture of 104 parts of o-phthalic acid, 535 parts of 9,10-epoxyoctadecanol (74% pure and 4.17% oxirane oxygen) and 1.0 part of sodium methoxide was heated at 150° C. for 10 hours. The crude reaction mixture was topped on a spinning disk still at 34–50 microns pressure up to 250° C. There was obtained 310 parts of product which had an acid number of 0 (nil), an ester number of 134.0, and a hydroxyl number 219.3.

Example 7

A mixture of 20 parts of isophthalic acid, 77 parts of 10,11-epoxyundecanol (96% pure and 8.3% oxirane oxygen) and 0.5 part of trimethylbenzylammonium hydroxide was heated at 125° C. for 76 hours. The crude reaction mixture was extracted 4 times with ethyl ether to remove the excess epoxyundecanol. The product amounted to 60.1 parts and was a waxy solid. It had an acid number of 4.6, an ester number of 137.8, and a hydroxyl number of 346.1

Example 8

A mixture of 140 g. of a commercial dimerized tall oil fatty acid containing about 75% dimerized acid and 25% rimerized acid, 200 g. of 9,10-epoxyoctadecanol (75% pure by oxirane analysis), and 1.0 g. of triethylenediamine as a catalyst was heated at 150° C. for 4 hours. During this time the acid number of the reaction mixture dropped from 85.0 to 11.0. The mixture was then heated at 200° C . for five hours, the acid number decreasing to 2.1 during this time. The crude reaction mixture was topped on a spinning disk still at 25–29 microns pressure up to 250° C. There was obtained 230.8 g. of product. The bis(1-n-octyl-2,10-dihydroxydecyl)ester of the dimer acid so obtained was found on analysis to have an acid number of 1.4, an ester number of 97.3 and a hydroxyl number of 159.7.

One part of the above bis(dihydroxyoctadecyl)ester of dimer acid was dissolved in 4.5 parts of tetrahydrofuran. The solution was agitated and 2.5 parts of a 10% solution of toluene diisocyanate in tetrahydrofuran was added. The solution was then poured onto a glass plate, and the tetrahydrofuran was evaporated. The glass plate and film thereon was then heated for 2½ hours at 75° C. whereby there was obtained a clear, rubbery film which could be elongated about 50%. This film was insoluble in all conventional solvents in which the unreacted polyol was soluble such as methanol, methyl isobutyl ketone, tetrahydrofuran, etc.

One part of the polyhydroxyester prepared as described above was dissolved in 4.5 parts of tetrahydrofuran. To this solution was added 0.37 part of a butylated melamine-formaldehyde resin solution (50% solids). The resulting solution was poured onto a glass plate and the solvent allowed to evaporate. The solution was cured at 150° C. for 2½ hours. The film so obtained was a clear, soft and insoluble film in methanol, methyl isobutyl ketone and tetrahydrofuran.

One part of the above polyhydroxyester was dissolved in 4.5 parts of tetrahydrofuran. To this solution was added a solution of 0.25 part of phthalic anhydride in 4.5 parts of tetrahydrofuran. The reaction mixture, after thorough mixing, was poured onto a glass plate and the solvent allowed to evaporate. The film was then baked at 150° C. for 2½ hours. The film so obtained was soft, rubbery and insoluble in methanol, methyl isobutyl ketone and tetrahydrofuran.

What I claim and desire to protect by Letters Patent is:

1. As a composition of matter, a polyhydroxyester having the formula:

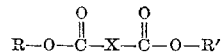

where R is selected from the group consisting of

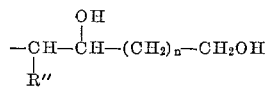

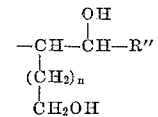

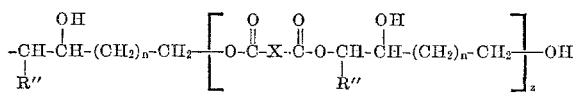

and

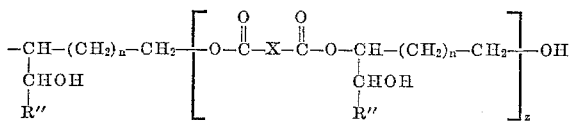

and R' is selected from the group consisting of

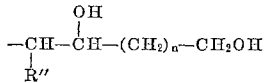

and

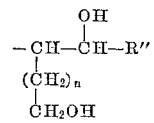

where R" is selected from the group consisting of hydrogen and alkyl, $n$ is a number from 0 to 10, the sum of the carbons in R" and $(CH_2)_n$ being from 7 to 15, $z$ is a number from 0 to 1, and X is selected from the group consisting of alkylene and phenylene.

2. The β,ω-dihydroxyalkyl diester of alkylene dicarboxylic acid wherein the alkyl groups each contain from 10 to 18 carbon atoms.

3. The 1-(ω-hydroxyalkyl)-2-hydroxyalkyl diester of alkylene dicarboxylic acid wherein the sum of the carbons in each of the ester groups is from 10 to 18.

4. The β,ω-dihydroxyalkyl diester of phenylene dicarboxylic acid wherein the alkyl groups each contain from 10 to 18 carbon atoms.

5. The 1-(ω-hydroxyalkyl)-2-hydroxyalkyl diester of phenylene dicarboxylic acid wherein the sum of the carbons in each of the ester groups is from 10 to 18.

6. Bis(1-n-octyl-2,10-dihydroxydecyl) adipate.

7. Bis(1-n-octyl-2,10-dihdroxydecyl) isophthalate.

8. Bis(1-n-octyl-2,10-dihydroxydecyl) o-phthalate.

9. Bis(1-n-octyl-2,10-dihydroxydecyl) 1,12-dodecandioate.

10. Bis(2,11-dihydroxyundecyl) isophthalate.

11. Bis(1-n-octyl-2,10-dihydroxydecyl) ester of dimerized higher fatty acids.

12. The mixture of tetrahydroxy and pentahydroxy esters obtained on reacting dimerized tall oil fatty acids with an amount of 9,10-epoxyoctadecanol equal to at least one mole for each carboxylic acid group in said acids, at a temperature of from about 130° C. to about 200° C. for a period of at least 4 hours in the presence of from about 0.2 to about 0.7% by weight of said acids of triethylene diamine as catalyst for said reaction.

References Cited by the Examiner

UNITED STATES PATENTS

| | | | |
|---|---|---|---|
| 2,073,031 | 3/1937 | Sly | 260—485 |
| 2,429,219 | 10/1947 | Cowan et al. | 260—407 |
| 2,499,984 | 3/1950 | Beavers et al. | 260—485 |
| 2,645,659 | 7/1953 | Morris et al. | 260—485 |
| 2,962,524 | 11/1960 | Hostettler et al. | 260—410.6 XR |

CHARLES B. PARKER, *Primary Examiner.*

DANIEL D. HORWITZ, *Examiner.*